(12) United States Patent
Kawabayashi

(10) Patent No.: US 11,473,912 B2
(45) Date of Patent: Oct. 18, 2022

(54) LOCATION-ESTIMATING DEVICE AND COMPUTER PROGRAM FOR LOCATION ESTIMATION

(71) Applicant: TOYOTA JIDOSHA KABUSHIKI KAISHA, Toyota (JP)

(72) Inventor: Hisashi Kawabayashi, Sagamihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/083,508

(22) Filed: Oct. 29, 2020

(65) Prior Publication Data
US 2021/0148707 A1 May 20, 2021

(30) Foreign Application Priority Data

Nov. 18, 2019 (JP) .............................. JP2019-207995

(51) Int. Cl.
*G01C 21/16* (2006.01)

(52) U.S. Cl.
CPC ..... *G01C 21/1652* (2020.08); *G01C 21/1656* (2020.08); *G01C 21/188* (2020.08)

(58) Field of Classification Search
CPC ............ G01C 21/1652; G01C 21/1656; G01C 21/188; G01C 21/30; G01C 21/16
See application file for complete search history.

(56) References Cited

U.S. PATENT DOCUMENTS

| 5,764,786 A * | 6/1998 | Kuwashima | ............... G06T 7/20 |
| | | | 348/E5.042 |
| 7,783,076 B2 * | 8/2010 | Tsunashima | ............ G06T 7/246 |
| | | | 382/103 |
| 9,658,317 B2 * | 5/2017 | Reimann | ............... H04W 4/026 |
| 10,612,937 B2 * | 4/2020 | Takatani | ................. G06T 7/248 |
| 11,112,508 B2 * | 9/2021 | Yoshino | .................. G01S 19/40 |
| 2007/0014432 A1 * | 1/2007 | Tsunashima | .......... G01S 3/7864 |
| | | | 382/103 |

(Continued)

FOREIGN PATENT DOCUMENTS

| JP | 2012108015 A | 6/2012 |
| JP | 2018077162 A | 5/2018 |
| JP | 2018155731 A | 10/2018 |

*Primary Examiner* — Tung S Lau
(74) *Attorney, Agent, or Firm* — Dickinson Wright, PLLC

(57) ABSTRACT

A location-estimating device comprises a processor configured to acquire first locational information representing the location of a moving object for each first information acquisition time and calculate a first estimated location, acquire second locational information representing the location of the moving object for each second information acquisition time and calculate a second estimated location, and when the first estimated location has been determined, calculate the first movement amount and moving direction between the first information acquisition time and current time, and estimate the location at the current time based on the first estimated location, first movement amount and moving direction, or when the first estimated location is not determined, calculate a second movement amount and moving direction between the preceding second information acquisition time and current time, and estimate the location at the current time based on the second estimated location, second movement amount and moving direction.

4 Claims, 9 Drawing Sheets

(56) References Cited

U.S. PATENT DOCUMENTS

| | | | |
|---|---|---|---|
| 2009/0018768 A1* | 1/2009 | Jo | G01S 19/34 |
| | | | 701/465 |
| 2012/0197519 A1* | 8/2012 | Richardson | G01C 21/3647 |
| | | | 701/408 |
| 2013/0231856 A1* | 9/2013 | Bachmann | G01S 19/48 |
| | | | 701/409 |
| 2014/0249745 A1* | 9/2014 | Brege | G01S 5/18 |
| | | | 701/411 |
| 2015/0084750 A1* | 3/2015 | Fitzgibbon | G01S 5/14 |
| | | | 340/12.29 |
| 2017/0356756 A1* | 12/2017 | Takatani | G01C 19/5776 |
| 2019/0187297 A1* | 6/2019 | Li | G01S 19/49 |
| 2020/0003563 A1 | 1/2020 | Miyake et al. | |
| 2020/0025575 A1* | 1/2020 | Weissman | G01S 17/06 |

* cited by examiner

FIG. 3

| BUFFER NO. | 1 | 2 | 3 | 4 | 5 | 6 | 7 | 8 | 9 | 10 |
|---|---|---|---|---|---|---|---|---|---|---|
| POSITIONING TIME | 0 | 32 | 64 | 96 | 128 | 160 | 192 | 224 | 256 | 288 |
| VEHICLE SPEED | | | | | | | | | | |
| YAW RATE | | | | | | | | | | |
| INITIAL LOCATION | | | | | | | | | | |

300

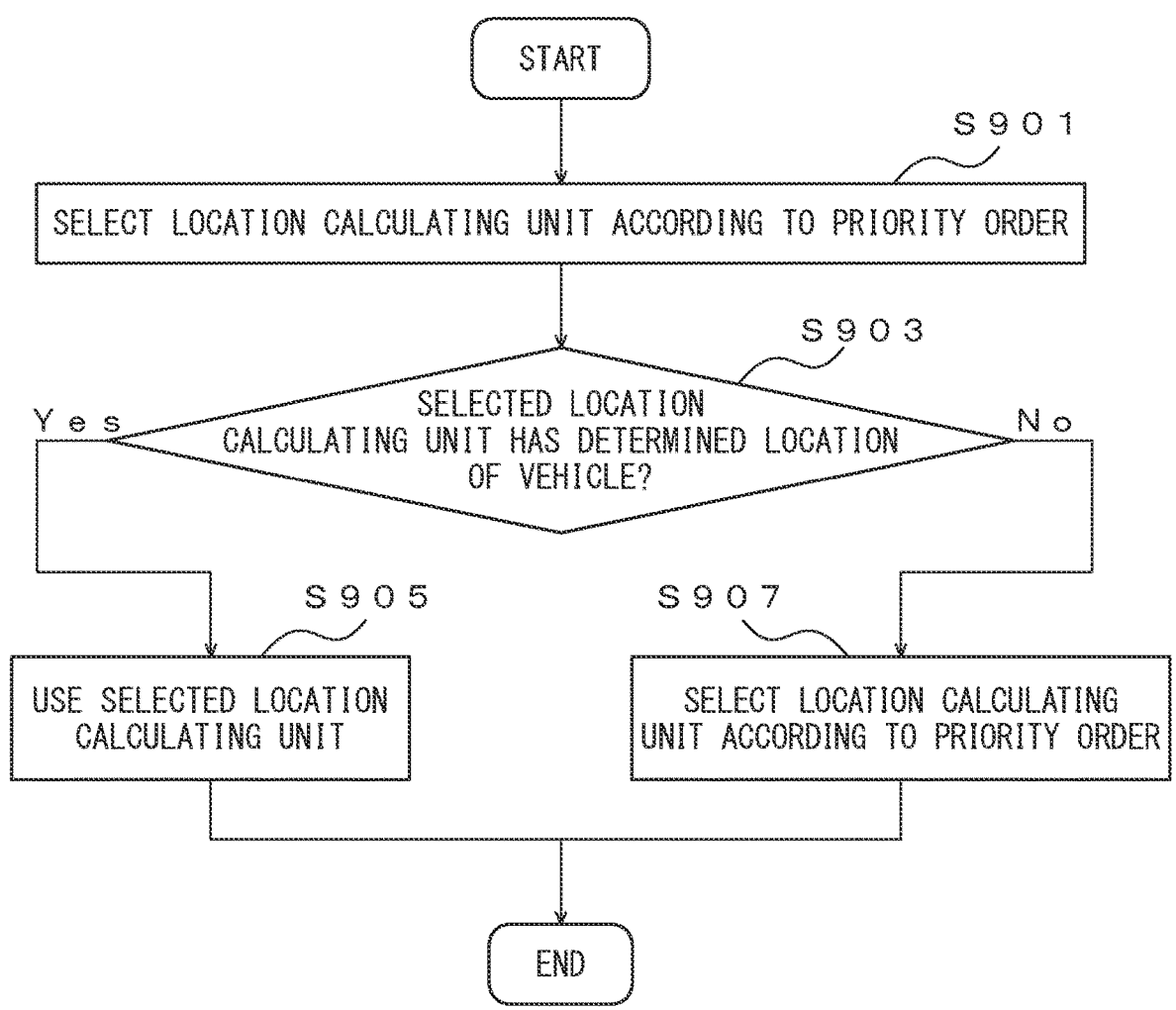

LOCATION-ESTIMATING DEVICE AND COMPUTER PROGRAM FOR LOCATION ESTIMATION

FIELD

The present invention relates to a location-estimating device and to a computer program for location estimation.

BACKGROUND

Methods for estimating of vehicle locations are being studied for use in support of vehicle operation and self-driving control.

For example, it has been known that the location of a vehicle can be estimated by using a vehicle-mounted camera to take forward images, and recognizing lane marking lines in the images, comparing the lane marking lines against a map (Japanese Unexamined Patent Publication No. 2018-77162, for example).

A vehicle location that is determined based on an image taken with camera is the location of the vehicle at the time the image was taken.

SUMMARY

Inaccuracies commonly result when estimating vehicle locations, and it is therefore desirable to be able to estimate vehicle locations with higher precision.

It is an object of the present invention to provide a location-estimating device that determines the location of a moving object at high precision.

One embodiment of the invention provides a location-estimating device. The location-estimating device has an input device, and a processor configured to acquire first locational relationship information representing the location of a moving object for each first information acquisition time set with a first cycle through the input device, calculate a first estimated location for the moving object at the first information acquisition time based on the first locational relationship information, acquire second locational relationship information representing the location of the moving object for each second information acquisition time set with a second cycle through the input device, calculate a second estimated location for the moving object at the second information acquisition time based on the second locational relationship information, and when the first estimated location has been determined based on the first locational relationship information acquired at the preceding first information acquisition time, calculate the first movement amount and first moving direction of the moving object between the first information acquisition time and the current time, based on information representing the behavior of the moving object, and estimate the location of the moving object at the current time based on the first estimated location and the first movement amount and first moving direction of the moving object, or when the first estimated location is not determined based on the first locational relationship information acquired at the preceding first information acquisition time, calculate a second movement amount and second moving direction of the moving object between the preceding second information acquisition time and the current time based on information representing the behavior of the moving object, and estimate the location of the moving object at the current time based on the second estimated location and the second movement amount and second moving direction of the moving object.

With this location-estimating device, the interval for estimation of the location of a moving object by the processor is preferably shorter than the first cycle and second cycle.

In addition, the precision of the first estimated location obtained by the location-estimating device is preferably higher than the precision of the second estimated location.

According to another embodiment, a computer readable non-transitory storage medium is provided which stores a computer program for location estimation. The computer readable non-transitory storage medium which stores a computer program for location estimation that causes a processor to acquire first locational relationship information representing the location of a moving object for each first information acquisition time set with a first cycle through an input device, calculate a first estimated location for the moving object at the first information acquisition time based on the first locational relationship information, acquire second locational relationship information representing the location of the moving object for each second information acquisition time set with a second cycle through the input device, calculate a second estimated location for the moving object at the second information acquisition time based on the second locational relationship information, and when the first estimated location has been determined based on the first locational relationship information acquired at the preceding first information acquisition time, calculate the first movement amount and first moving direction of the moving object between the first information acquisition time and the current time, based on information representing the behavior of the moving object, and estimate the location of the moving object at the current time based on the first estimated location and the first movement amount and first moving direction of the moving object, or when the first estimated location is not determined based on the first locational relationship information acquired at the preceding first information acquisition time, calculate a second movement amount and second moving direction of the moving object between the preceding second information acquisition time and the current time based on information representing the behavior of the moving object, and estimate the location of the moving object at the current time based on the second estimated location and the second movement amount and second moving direction of the moving object.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram showing a data buffer stored in a memory.

FIG. 9 is a flow chart (3) illustrating the operation of a location estimating unit.

DESCRIPTION OF EMBODIMENTS

Figure 1:
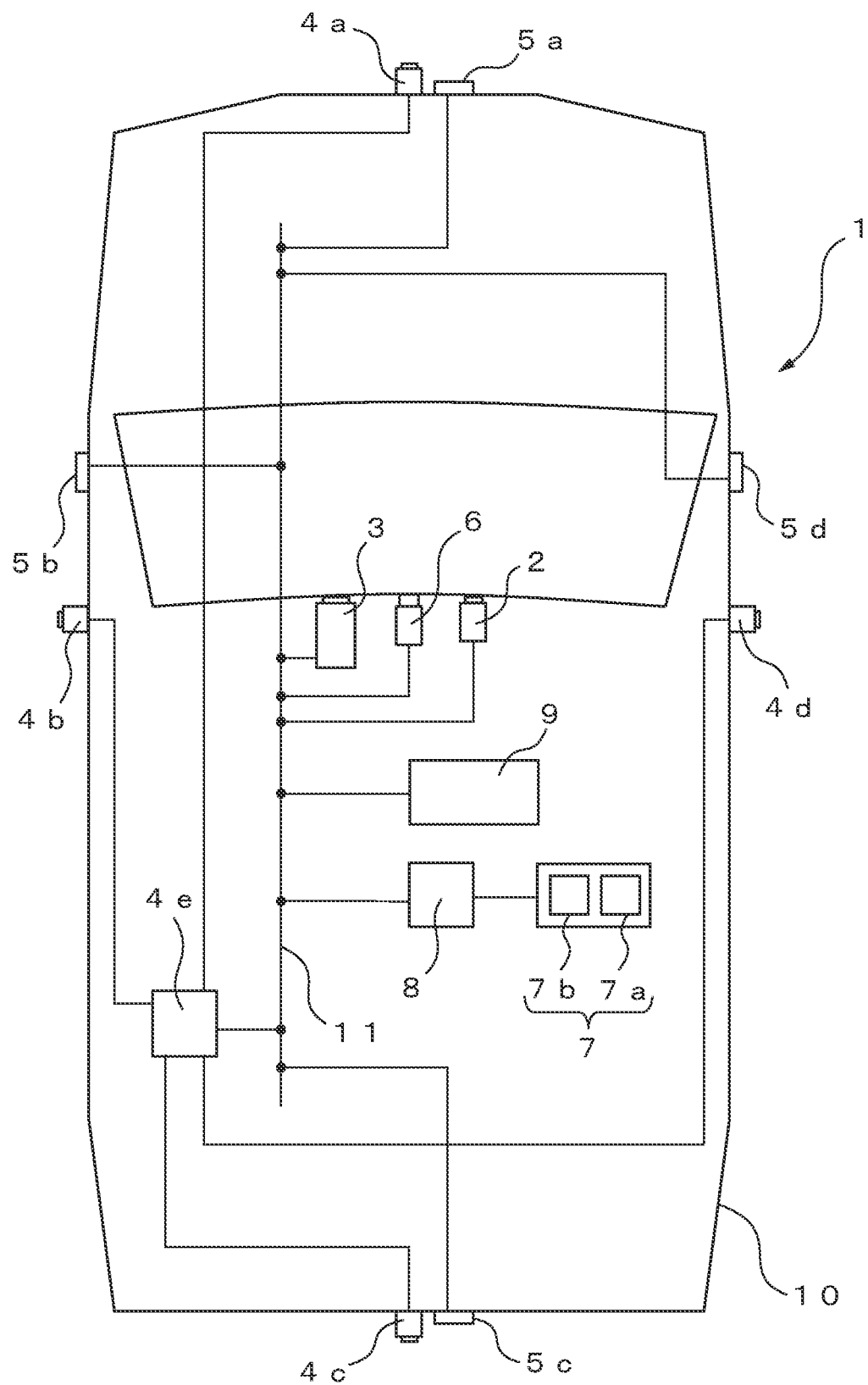
FIG. 1 is a general schematic drawing of a vehicle control system equipped with a location-estimating device.

The location-estimating device will now be described with reference to the accompanying drawings. The location-estimating device has a first locational information acquiring unit which acquires first locational relationship information representing the location of a moving object, for each first information acquisition time set with the first cycle. The first locational information acquiring unit may be a camera that photographs the vehicle surroundings, for example, and the first locational relationship information may be an image in which the vehicle surroundings are represented. The location-estimating device has first location calculating unit that calculates a first estimated location of the moving object at a first information acquisition time, based on the first locational relationship information. The location-estimating device also has a second locational information acquiring unit which acquires second locational relationship information representing the location of the moving object, for each second information acquisition time set with the second cycle. The second locational information acquiring unit preferably has different hardware from the first locational information acquiring unit. The location-estimating device has a second location calculating unit that calculates a second estimated location of the moving object at a second information acquisition time, based on the second locational relationship information. The location-estimating device has a location estimating unit that, when the first estimated location has been determined based on the first locational relationship information acquired at the preceding first information acquisition time, calculates the first movement amount and first moving direction of the moving object between the first information acquisition time and the current time based on information representing the behavior of the moving object, and estimates the location of the moving object at the current time based on the first estimated location and the first movement amount and first moving direction of the moving object.

On the other hand, when the first estimated location has not been determined based on the first locational relationship information acquired at the preceding first information acquisition time, the location estimating unit calculates the second movement amount and second moving direction of the moving object between the preceding second information acquisition time and the current time based on information representing the behavior of the moving object, and estimates the location of the moving object at the current time based on the second estimated location and the second movement amount and second moving direction of the moving object. As a result, even when the location of the moving object has not been determined using the first locational relationship information, the location-estimating device uses the second locational relationship information to allow the location of the moving object to be determined with high precision.

The location-estimating device will now be described as an example being applied in a vehicle control system. For this example, the location-estimating device carries out location estimation processing based on an image acquired from a camera mounted in a vehicle, whereby it estimates the location of the vehicle, producing a vehicle operation plan based on the estimated location and utilizing it for operation control of the vehicle. The technical scope of the invention is not limited to this embodiment, and includes the invention and its equivalents as laid out in the Claims.

Figure 2:
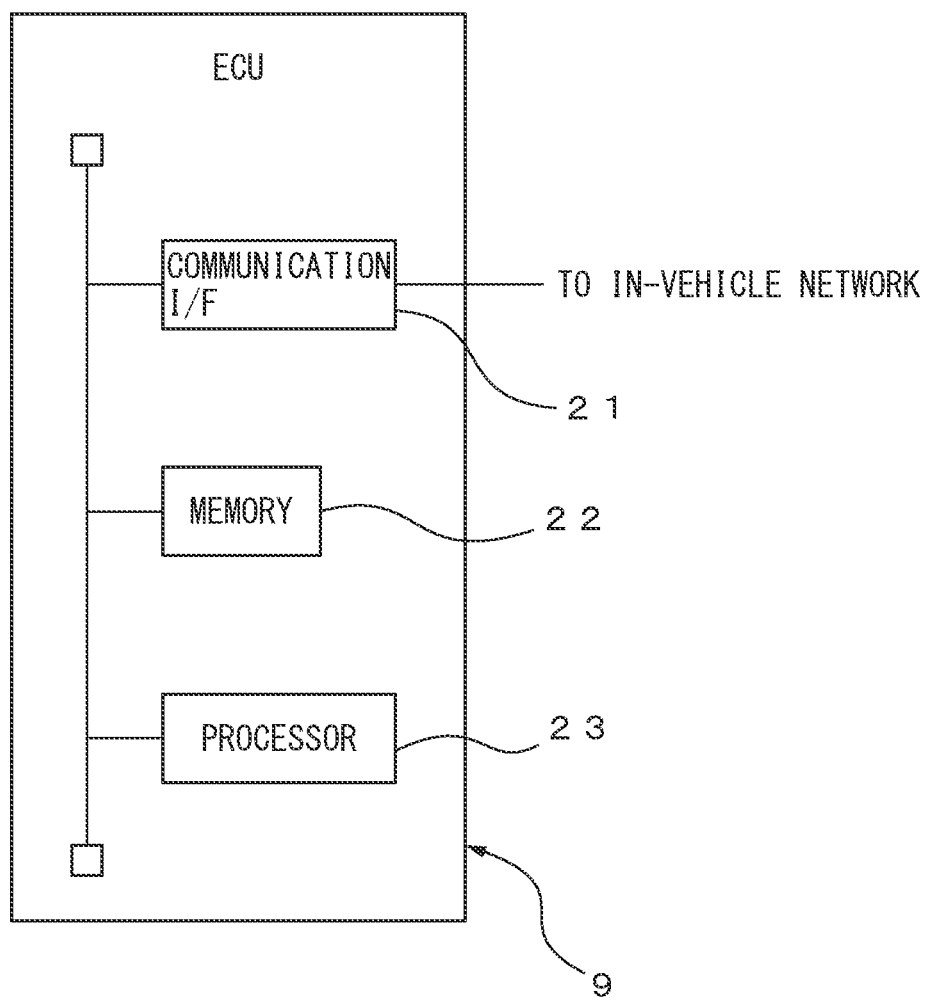
FIG. 2 is a hardware configuration diagram of an electronic control unit as an embodiment of the location-estimating device.

FIG. 1 is a general schematic drawing of a vehicle control system equipped with a location-estimating device. FIG. 2 is a hardware configuration diagram of an electronic control unit as an embodiment of the location-estimating device.

For this embodiment, a vehicle control system 1 that is mounted in a vehicle 10 and controls the vehicle 10 has a first camera 2 that acquires an image ahead of the vehicle, and a second camera 3 that is separate from the first camera 2 and acquires an image ahead of the vehicle 10. The vehicle control system 1 has third cameras 4a to 4d that acquire images toward the front and rear and left and right of the vehicle 10, and a camera image processing unit 4e that processes the images taken by the third cameras 4a to 4d. The vehicle control system 1 also has LiDAR sensors 5a to 5d situated at the front and rear and left and right sides of the vehicle 10, and a fourth camera 6 that acquires an image far ahead of the vehicle 10. The vehicle control system 1 also has a positioning information receiver 7, a map information storage device 8 that produces map information based on the positioning information output by the positioning information receiver 7, and an electronic control unit (ECU) 9 as an example of a location-estimating device.

The first camera 2, second camera 3, camera image processing unit 4e, LiDAR sensors 5a to 5d, fourth camera 6, map information storage device 8 and ECU 9 are connected in a communicable manner through an in-vehicle network 11 conforming to the Controller Area Network standard.

The first camera 2 is an example of a locational information acquiring unit. The first camera 2 acquires a first image in which a predetermined region ahead of the vehicle 10 is shown, as an example of locational relationship information, at the first information acquisition time set with a predetermined cycle (for example, 100 msec). The acquired first image shows outside features such as road surface lane marking lines that are within the predetermined region ahead of the vehicle 10. The first image contains relative positional information between the vehicle 10 and outside features surrounding the vehicle 10. The first image obtained by the first camera 2 may be a color image or a gray image. The first camera 2 is an example of an imaging unit, and it has a 2D detector composed of an array of photoelectric conversion elements with visible light sensitivity, such as a CCD or C-MOS, and an imaging optical system that forms an image of the photographed region on the 2D detector. The first camera 2 is mounted inside the compartment of the vehicle 10 and directed toward the front of the vehicle 10.

The first camera 2 outputs the first image and the first information acquisition time during which the first image was acquired, through the in-vehicle network 11 to the ECU 9, each time a first image is acquired. At the ECU 9, the first image is used for processing to determine the location of the vehicle as locational relationship information, and for processing to determine any other objects around the vehicle 10.

The second camera 3 is another example of a locational information acquiring unit. The second camera 3 acquires a second image in which a predetermined region ahead of the vehicle is shown, as an example of locational relationship information, at the second information acquisition time set with a predetermined cycle (for example, 150 msec). The second image contains relative positional information between the vehicle 10 and outside features surrounding the vehicle 10. The second camera 3 is set at a different location than the first camera 2, and directed in a different direction from the first camera 2. For example, the second camera 3 is mounted inside the compartment of the vehicle 10 and directed toward the front of the vehicle 10, similar to the first camera 2. The acquired images show outside features such as road surface lane marking lines that are within the predetermined region ahead of the vehicle 10. The image obtained by the second camera 3 may be a color image or a gray image. The second camera 3 is an example of an imaging unit, and it has a 2D detector composed of an array of photoelectric conversion elements with visible light sensitivity, such as a CCD or C-MOS, and an imaging optical system that forms an image of the photographed region on the 2D detector. The second camera 3 outputs the second image and the second information acquisition time during which the second image was acquired, through the in-vehicle network 11 to the ECU 9, each time a second image is acquired. At the ECU 9, the second image is used for processing to determine the location of the vehicle, as locational relationship information.

The third cameras 4a to 4d acquire images in which predetermined regions ahead, to the left, behind and to the right of the vehicle 10 are shown, for a third information acquisition time set with a predetermined cycle (for example, 180 msec), and outputs them to a camera image processing unit 4e.note. These images contain relative positional information between the vehicle 10 and outside features surrounding the vehicle 10. The third cameras 4a to 4d are examples of imaging units, and they each have a 2D detector composed of an array of photoelectric conversion elements with visible light sensitivity, such as a CCD or C-MOS, and an imaging optical system that forms an image of the photographed region on the 2D detector. The third cameras 4a to 4d are mounted at the front, rear, left and right of the vehicle 10 and directed toward the front, the left, the rear and the right of the vehicle 10. The images obtained by the third cameras 4a to 4d may be color images or gray images.

The camera image processing unit 4e includes a processor (not shown). The processor of the camera image processing unit 4e combines the images produced by the third cameras 4a to 4d to produce a composite image of the surrounding of the vehicle 10. The processor of the camera image processing unit 4e outputs the composite image and the third information acquisition time at which the composite image has been acquired, through the in-vehicle network 11 to the ECU 9, for each composite image produced. The composite image in which the surrounding area of the vehicle 10 is represented is used for processing by the ECU 9 to detect other objects around the vehicle 10.

At a fourth information acquisition time set with a predetermined cycle, each of the LiDAR sensors 5a to 5d synchronizes and emits a pulsed laser toward the front, the left, the rear and the right of the vehicle 10, respectively, receiving a reflected wave reflected from a reflector, and outputs the fourth information, which includes the reflected wave information and information about the direction in which the laser was emitted, together with the fourth information acquisition time at which the laser was emitted, to the ECU 9 through the in-vehicle network 11. The reflected wave contains relative positional information between the vehicle 10 and outside features surrounding the vehicle 10.

At a fifth information acquisition time set with a predetermined cycle, the fourth camera 6 acquires a third image in which a predetermined region that is further ahead of the vehicle 10 than the first camera 2 and second camera 3 is shown. The third image shows outside features such as road surface lane marking lines that are within the predetermined region far ahead of the vehicle 10. The third image contains relative locational relationship information between the vehicle 10 and outside features surrounding the vehicle 10. The third image obtained by the fourth camera 6 may be a color image or a gray image. The fourth camera 6 is an example of an imaging unit, and it has a 2D detector composed of an array of photoelectric conversion elements with visible light sensitivity, such as a CCD or C-MOS, and an imaging optical system that forms an image of the photographed region on the 2D detector. The fourth camera 6 is mounted inside the compartment of the vehicle 10 in the same manner as the first camera 2, for example, and is directed toward a region far ahead of the vehicle 10.

The fourth camera 6 outputs the third image, as locational relationship information, and the fifth information acquisition time during which the third image was acquired, through the in-vehicle network 11 to the ECU 9, each time a third image is acquired. The third image is used for processing by the ECU 9 to detect other objects around the vehicle 10.

The positioning information receiver 7 outputs positioning information that represents the current location of the vehicle 10. The positioning information receiver 7 may be a GPS receiver, for example. The positioning information receiver 7 has a positioning information receiver 7a that receives GPS radio waves, and a processor 7b that outputs positioning information representing the current location of the vehicle 10, based on the GPS radio waves received by the positioning information receiver 7a. The positioning information receiver 7a is another example of a locational information acquiring unit. The processor 7b outputs positioning information as locational relationship information and sixth information acquisition time at which the positioning information has been acquired, to the map information storage device 8 each time positioning information is acquired by the positioning information receiver 7a at a predetermined receiving cycle.

The map information storage device 8 has a processor (not shown) and a storage device (not shown) such as a magnetic disk drive or a non-volatile semiconductor memory, the storage device storing wide-area map information for a wide area that includes the current location of the vehicle 10 (for example, a range of several square kilometers). The wide-area map information is preferably high precision map information including information for the types and locations of structures or outside features such as road lane marking lines. The locations of road outside features and structures are represented by the world coordinate system, with a predetermined reference location in real space as the origin. The processor of the map information storage device 8 receives the wide-area map information from an external server via a base station, by wireless communication through a wireless communication device, in relation to the current location of the vehicle 10, and stores it in the storage device. With reference to the wide-area map information stored in the memory, the processor of the map information storage device 8 outputs the map information for a narrow area including the current location represented by the positioning information (for example, an area of several tens to several hundreds of square meters) and the sixth information acquisition time, via the in-vehicle network 11 to the ECU 9, each time positioning information is input from the positioning information receiver 7.

The ECU 9 controls the vehicle 10. For this embodiment, the ECU 9 estimates the location of the vehicle 10 based on the locational relationship information output by the first camera 2 and other cameras, and controls the vehicle 10 so that it is self-driven (automatic control operation). For this purpose, the ECU 9 has a communication interface 21, a memory 22 and a processor 23.

The communication interface (I/F) 21 (also referred to herein as an "input device") is an example of a communication unit, and it has an interface circuit to connect the ECU 9 with the in-vehicle network 11. Specifically, the communication interface 21 is connected with the first camera 2 and map information storage device 8, for example, via the in-vehicle network 11. Each time a first image and first information acquisition time are received from the first camera 2, for example, the communication interface 21 passes the received first image and first information acquisition time to the processor 23. Each time positioning information, sixth information acquisition time and map information are received from the map information storage device 8, the communication interface 21 passes the received positioning information, sixth information acquisition time and map information to the processor 23. The communication interface 21 passes the vehicle speed and yaw rate, received from a vehicle speed sensor and yaw rate sensor (not shown), to the processor 23.

The memory 22 is an example of a memory unit, and it has a volatile semiconductor memory and a non-volatile semiconductor memory, for example. The memory 22 stores various data to be used in location estimation processing carried out by the processor 23 of the ECU 9, installation location information such as the optical axis direction and mounting position of each camera and LiDAR sensor, and internal parameters such as the focal length and viewing angle of the imaging optical system. The memory 22 also stores the locational relationship information and information acquisition time for the first image and other images received from the first camera 2 and other cameras, and the positioning information, sixth information acquisition time and map information received from the map information storage device 8.

As shown in FIG. 3, the memory 22 stores a data buffer 300. The data buffer 300 is a ring-type data buffer, and in the example shown in FIG. 3 it has ten buffers. Each buffer stores the positioning time, vehicle speed, yaw rate and the location of the vehicle 10 determined at the previous positioning time, as the initial location. Data are stored in order from buffer #1 in the data buffer 300, and after the 10th piece of data has been stored in buffer #10, the 11th piece of data is written over the data in buffer #1. The processor 23 determines the average value for the vehicle speed and yaw rate between the previous positioning time and the current positioning time, based on the input vehicle speed and yaw rate, and it stores the average value in a data buffer of the memory 22 in relation to the current positioning time.

The processor 23 is an example of a controller, and it comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. Based on the locational relationship information, the processor 23 carries out location estimation processing to estimate the location of the vehicle 10 for the information acquisition time at which the current locational relationship information was acquired. The processor 23 also carries out location estimation processing to estimate the location of the vehicle 10 for positioning times set within the predetermined cycle (for example, 32 msec). The positioning time cycle will normally be shorter than the cycle for the first to fifth information acquisition times. The processor 23 determines the location of the vehicle 10 at the current positioning time, based on information representing the location of the vehicle 10 at the previous positioning time, the location of the vehicle 10 at the information acquisition time, and the behavior of the vehicle 10 including the vehicle speed and yaw rate. The processor 23 also controls the vehicle 10 based on the relative positional relationship between the estimated location of the vehicle 10 and other objects around the vehicle 10, so that it makes the vehicle 10 self-driving.

Figure 4:
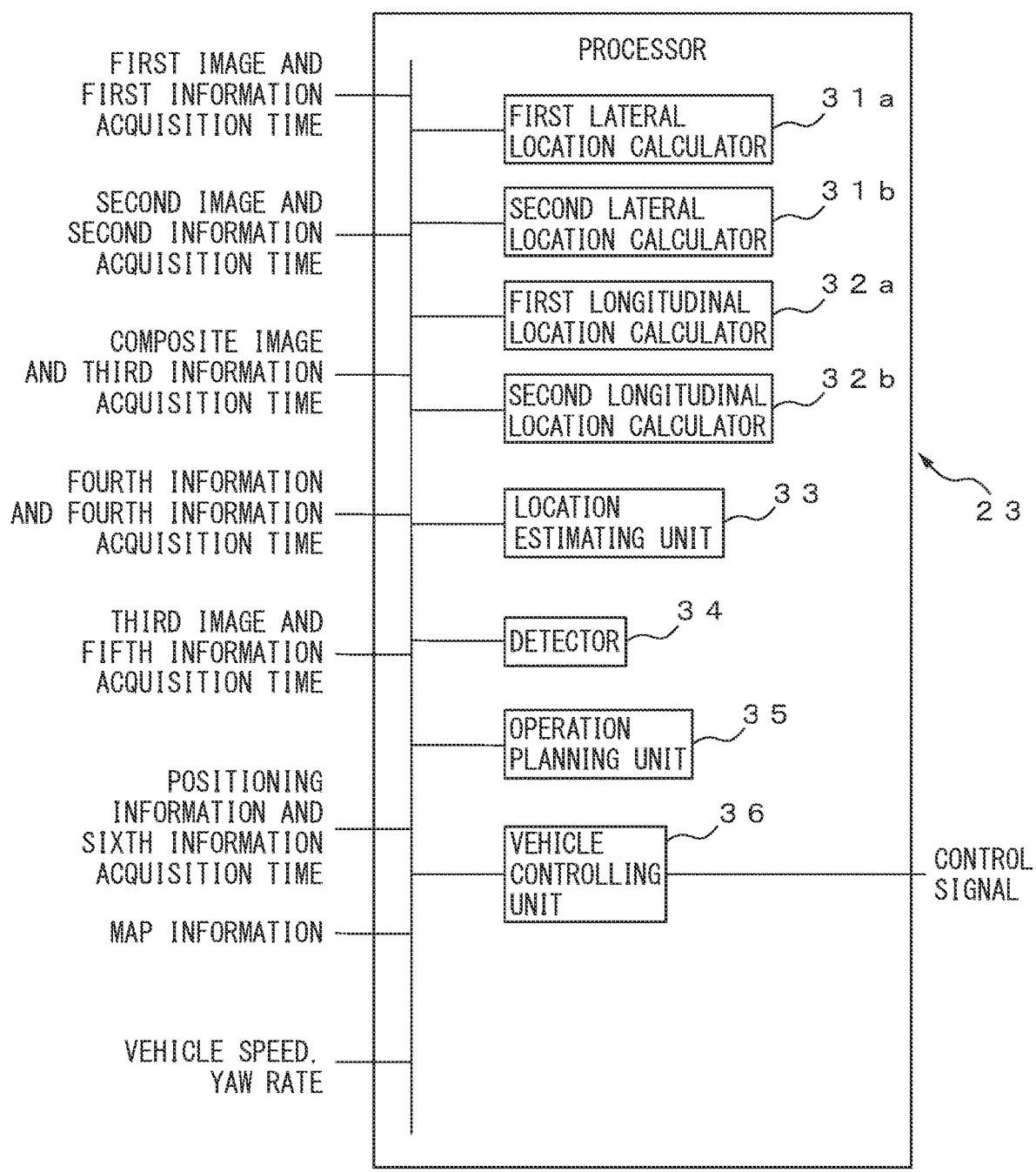
FIG. 4 is a functional block diagram of a processor of an electronic control unit, related to vehicle control processing that includes location estimation processing.

FIG. 4 is a functional block diagram of the processor 23 of the ECU 9, as it relates to vehicle control processing that includes location estimation processing. The processor 23 has first and second lateral location calculators 31a, 31b, first and second longitudinal location calculators 32a, 32b, a location estimating unit 33, a detector 34, an operation planning unit 35 and a vehicle controlling unit 36. Each of the units of the processor 23 are functional modules driven by a computer program operating on the processor 23, for example. Alternatively, each of the units of the processor 23 may be specialized computing circuits in the processor 23. Of the units of the processor 23, the first and second lateral location calculators 31a, 31b, the first and second longitudinal location calculators 32a, 32b and the location estimating unit 33 carry out location estimation processing.

Based on information such as the input locational relationship information, the first and second lateral location calculators 31a, 31b of the processor 23 estimate the location of the vehicle 10 at the information acquisition time at which the locational relationship information has been acquired, and determine the degree of lateral shift as the component of the direction perpendicular to the traveling direction of the vehicle 10 within the difference between the location of the vehicle 10 and the reference location of the vehicle 10, subsequently notifying the location estimating unit 33. The reference location is the location of the vehicle 10 at the information acquisition time, estimated based on the location of the vehicle at the positioning time immediately preceding the information acquisition time, and the amount of movement and moving direction of the vehicle 10 during the time between the positioning time and the information acquisition time.

Based on the input locational relationship information, the first and second longitudinal location calculators 32a, 32b of the processor 23 estimate the location of the vehicle 10 at the information acquisition time at which the locational relationship information has been acquired, and determine the degree of longitudinal shift as the component of the traveling direction of the vehicle 10 within the difference between the location of the vehicle 10 and the reference location of the vehicle 10, subsequently notifying the location estimating unit 33.

Figure 5:
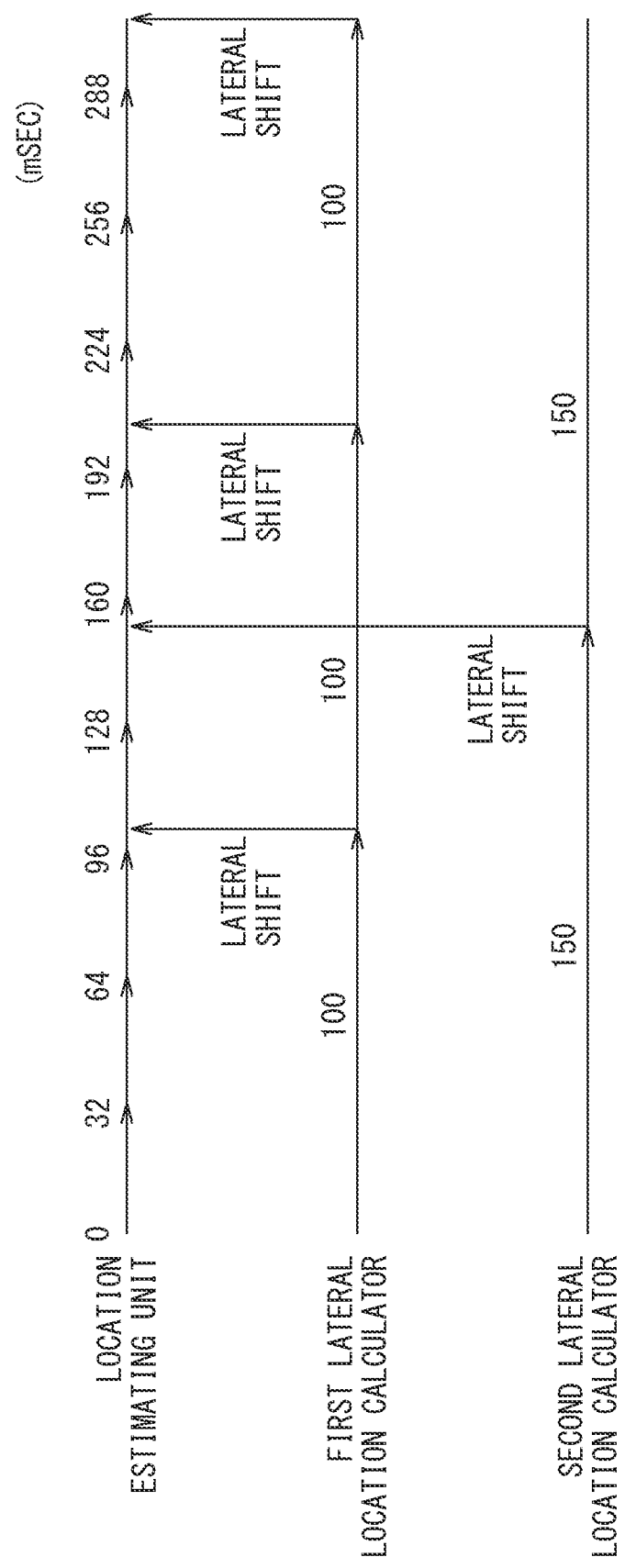
FIG. 5 is a timing diagram that illustrates processing with a processor.

FIG. 5 is a timing diagram that illustrates processing with the processor 23. The location estimating unit 33 of the processor 23 estimates the location of the vehicle 10 at the current positioning time, based on the degree of lateral shift notified from one lateral location calculator selected from among the first and second lateral location calculators 31a, 31b and the degree of longitudinal shift notified from one longitudinal location calculator selected from among the first and second longitudinal location calculators 32a, 32b, as well as the location of the vehicle 10 within the positioning time, and the vehicle speed and yaw rate as information representing the behavior of the vehicle 10, for each positioning time set with the predetermined cycle (32 msec for the example shown in FIG. 5). The location estimating unit 33 also notifies the operation planning unit 35 and vehicle controlling unit 36 of the estimated location of the vehicle 10. The positioning time is an example of the current time.

The first lateral location calculator 31a determines the degree of lateral shift within the cycle of the first information acquisition time during which the first camera 2 acquires the first image (100 msec for the example shown in FIG. 5), and notifies the location estimating unit 33. The cycle in which the first lateral location calculator 31a determines the degree of lateral shift is longer than the cycle of the positioning time during which the location estimating unit 33 determines the location of the vehicle 10 (32 msec in the example shown in FIG. 5). Likewise, the second lateral location calculator 31b determines the degree of lateral shift within the cycle of the second information acquisition time during which the second camera 3 acquires an image (150 msec for the example shown in FIG. 5), and notifies the location estimating unit 33. The cycle in which the second lateral location calculator 31b determines the degree of lateral shift is also longer than the cycle of the positioning time during which the location estimating unit 33 determines the location of the vehicle 10 (32 msec in the example shown in FIG. 5).

Figure 6:
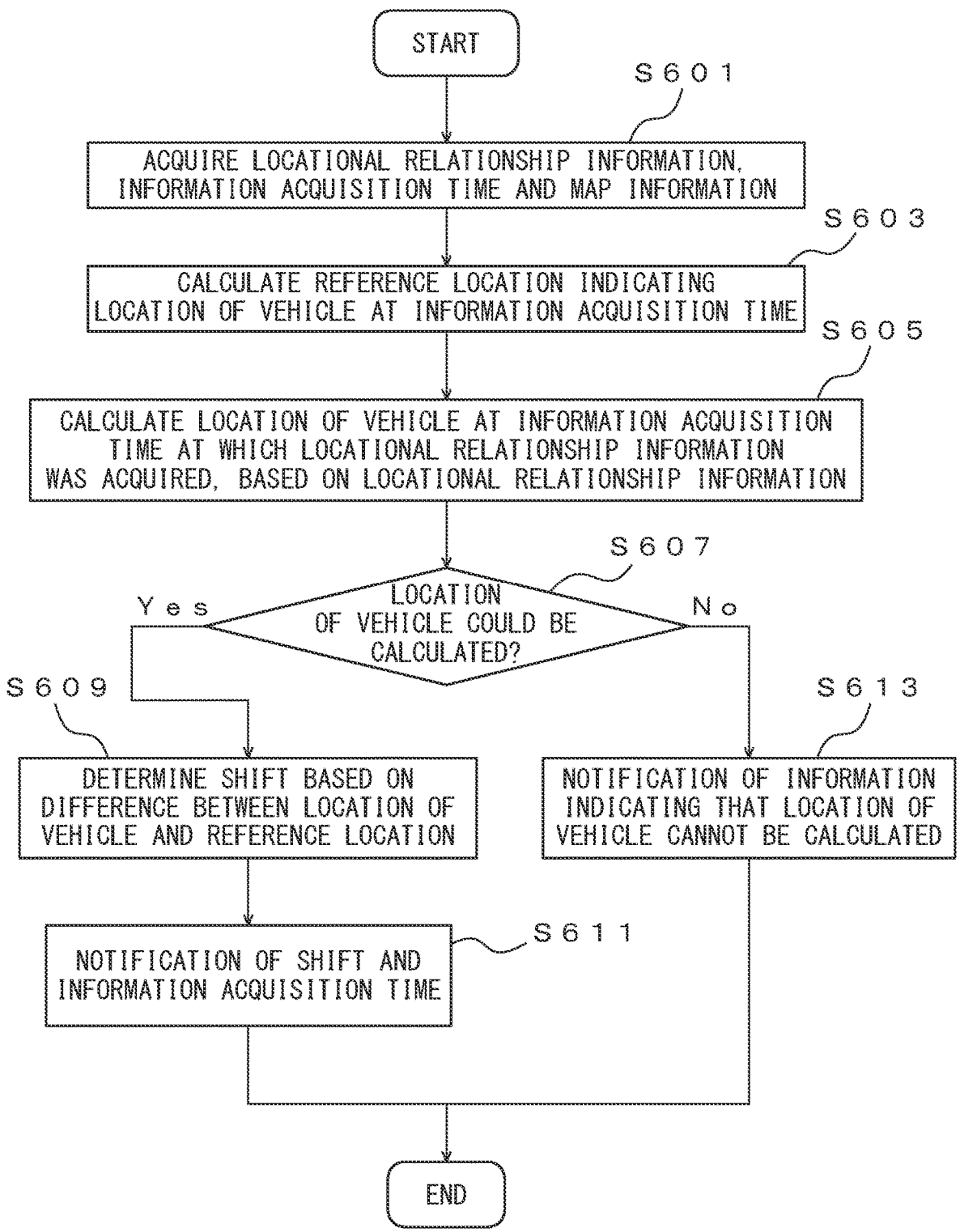
FIG. 6 is a flow chart illustrating the operation of a location calculating unit.

Processing in which the first lateral location calculator 31a calculates the degree of lateral shift of the location of the vehicle 10 will now be explained with reference to FIG. 6. The processing shown in FIG. 6 is carried out by the first lateral location calculator 31a each time the first camera 2 acquires a first image at the first information acquisition time.

First, the first lateral location calculator 31a acquires a first image as an example of locational relationship information, the first information acquisition time s1 at which the first image was acquired, and map information of a predetermined region including the location indicated by the positioning information (step S601).

The first lateral location calculator 31a then calculates a reference location indicating the location of the vehicle 10 at the first information acquisition time s1 at which the first image has been acquired, as an example of locational relationship information (step S603). First, the first lateral location calculator 31a refers to a data buffer in the memory 22 (see FIG. 3) and selects the positioning time s2 that is a time before the first information acquisition time s1 and nearest to the first information acquisition time s1. Since the cycle during which the first lateral location calculator 31a determines the degree of lateral shift in the location of the vehicle 10 (100 msec for the example shown in FIG. 5) is longer than the cycle of the positioning time (32 msec for the example shown in FIG. 5), the first information acquisition time s1 is a time before the most recent positioning time stored in the data buffer. From this viewpoint, it is preferred for the data buffer to store data for the positioning time in a period of at least twice the cycle during which each location calculating unit calculates the shift in the location of the vehicle 10. When the first information acquisition time s1 and the positioning time s2 are not the same, the first lateral location calculator 31a refers to the data buffer while acquiring the vehicle speed and yaw rate between the first information acquisition time s1 and the positioning time s2, to determine the amount of movement and moving direction of the vehicle between the first information acquisition time s1 and positioning time s2. The first lateral location calculator 31a performs time-integration of the speed of the vehicle 10 to determine the amount of movement of the vehicle 10 between the first information acquisition time s1 and positioning time s2, and time-integration of the yaw rate of the vehicle 10 to determine the moving direction of the vehicle 10 between the first information acquisition time s1 and positioning time s2. The first lateral location calculator 31a also calculates the location q1 of the vehicle 10 at the first information acquisition time s1, based on the initial location at the positioning time s2, and the amount of movement and moving direction of the vehicle 10, as the reference location of the vehicle 10. When the information acquisition time s1 and positioning time s2 are the same, on the other hand, the first lateral location calculator 31a uses the initial location at the next positioning time after the positioning time s2, as the reference location of the vehicle 10.

The first lateral location calculator 31a then calculates the location of the vehicle 10 at the first information acquisition time at which the first image has been acquired, based on the first image and the map information, as an example of locational relationship information (step S605). First, the first lateral location calculator 31a carries out viewpoint conversion processing on the coordinates of objects represented in the first image, using information such as the installation location information and internal parameters of the first camera 2, representing the result in a camera coordinate system with the location of the first camera 2 as the origin. The coordinates of an object represented in the first image can be represented in an image coordinate system with an Xi axis extending to the right and a Yi axis extending downward, using the location at the top left corner of the first image as the origin. In the camera coordinate system, using the center of the imaging surface as the origin, a Zc axis is set in the traveling direction of the vehicle 10, an Xc axis is set in a direction perpendicular to the Zc axis and parallel to the ground, and a Yc axis is set in the vertical direction, the origin being at a height from the ground that is the height where the first camera 2 is installed. The first lateral location calculator 31a then takes the coordinates of objects shown in the first image which have been represented in the camera coordinate system, and represents them in a world coordinate system. In the world coordinate system, an Xw axis and Zw axis are set within a plane parallel to the ground and a Yw axis is set in the vertical direction, with a predetermined reference location in real space as the origin. The first lateral location calculator 31a estimates the location and traveling direction of the vehicle 10 at the first information acquisition time, based on the location of the vehicle 10 at a positioning time that is before the first information acquisition time and nearest to the first information acquisition time, and the amount of movement and moving direction of the vehicle 10 between that positioning time and the first information acquisition time. For the location and traveling direction of the vehicle 10 at the first information acquisition time, the first lateral location calculator 31a can use the value determined when calculating the reference location of the vehicle 10. The first lateral location calculator 31a estimates an assumed location and assumed posture of the first camera 2 at the first information acquisition time, using the installation location information and internal parameters of the first camera 2, and the estimated location and moving direction of the vehicle 10. The first lateral location calculator 31a derives a conversion formula from the camera coordinate system to the world coordinate system, according to the assumed location and assumed posture of the first camera 2 at the first information acquisition time. The conversion formula is represented as a combination between a rotation matrix representing rotation within the coordinate system and a translation vector representing parallel movement within the coordinate system. The first lateral location calculator 31*a* then takes the coordinates of objects shown in the first image which have been represented in the camera coordinate system, and converts them to coordinates represented by the world coordinate system, according to the aforementioned conversion formula.

The first lateral location calculator 31*a* projects the first image represented by the world coordinate system onto a map represented by the map information, and calculates the degree of coincidence between a lane marking line, as an example of an outside feature around the vehicle 10 represented on the map, and a candidate point detected in the first image. For example, the first lateral location calculator 31*a* may calculate the degree of coincidence between a lane marking line around the vehicle 10 represented in the map and a candidate point detected within the first image, based on the number of candidate points within a matching region set within the first image (number of inliers). The first lateral location calculator 31*a* carries out processing such as the location conversion of the first image from the camera coordinate system to the world coordinate system as described above, and calculation of the degree of coincidence with lane marking lines, while varying the assumed location and assumed posture by a predetermined amount, to calculate the degree of coincidence between the first image and the lane marking lines around the vehicle 10 represented in the map information, for each of a plurality of assumed locations and assumed postures. The first lateral location calculator 31*a* identifies the assumed location and assumed posture where the degree of coincidence is maximal, and based on the assumed location and assumed posture of the first camera 2, estimates the location and traveling direction of the vehicle 10 at the first information acquisition time at which the image was acquired by the first camera 2. The first lateral location calculator 31*a* calculates the location of the vehicle 10 at the first information acquisition time based on the location of the vehicle 10 and the location of the lane marking lines on the map. The first lateral location calculator 31*a* notifies the first longitudinal location calculator 32*a* of the location of the vehicle 10 at the first information acquisition time and the reference location. The first lateral location calculator 31*a* also notifies the location estimating unit 33 of the location of the vehicle 10 at the first information acquisition time and the reference location.

The first lateral location calculator 31*a* then assesses whether or not the location of the vehicle 10 could be calculated at the first information acquisition time (step S607). For example, the first lateral location calculator 31*a* may assess whether or not lane marking lines within the first image are detectable, based on the number of inliers within the matching region that matches the lane marking lines within the first image. When the number of inliers is above a predetermined threshold value, the first lateral location calculator 31*a* may assess that the location of the vehicle 10 could be calculated, and when the number of inliers is below a predetermined threshold value, it may assess that the location of the vehicle 10 cannot be calculated.

When the location of the vehicle 10 could be calculated (step S607—Yes), the first lateral location calculator 31*a* determines the degree of lateral shift as the component in the lateral direction that is perpendicular to the traveling direction of the vehicle 10, based on the difference between the location of the vehicle 10 and the reference location (step S609). The first lateral location calculator 31*a* may use the location of the vehicle 10 as the location that is the both the center of the lateral direction as the direction perpendicular to the traveling direction of the vehicle 10 and the center in the traveling direction of the vehicle 10.

The first lateral location calculator 31*a* then notifies the location estimating unit 33 of the degree of lateral shift and the first information acquisition time (step S611).

When the location of the vehicle 10 could not be calculated (step S607—No), the first lateral location calculator 31*a* notifies the location estimating unit 33 and the first longitudinal location calculator 32*a* of information indicating that the location of the vehicle 10 cannot be calculated (step S613). The reason why the first lateral location calculator 31*a* cannot calculate the location of the vehicle 10 may be that it was not possible to detect a sufficient number of candidate points within the first image, or that the camera is malfunctioning. Examples of reasons why the candidate points cannot be detected within the first image are that the first image was taken against light, or that the camera lens is fouled, or that the first image was taken under poor weather conditions such as rain or fog. This completes explanation of the first lateral location calculator 31*a*.

The second lateral location calculator 31*b* determines the location of the vehicle 10 at the second information acquisition time, the reference location, and the degree of lateral shift, based on the second image and map information. The second lateral location calculator 31*b* may use the same processing as the first lateral location calculator 31*a*, for example, to determine the location of the vehicle 10 at the second information acquisition time, the reference location and the degree of lateral shift, based on the second image and map information. The second lateral location calculator 31*b* notifies the location estimating unit 33 of the location of the vehicle 10, the reference location, the degree of lateral shift and the second information acquisition time. When the location of the vehicle 10 cannot be calculated at the second information acquisition time, the second lateral location calculator 31*b* notifies the location estimating unit 33 and the second longitudinal location calculator 32*b* of information indicating that the location of the vehicle 10 cannot be calculated.

The first longitudinal location calculator 32*a* is notified by the first lateral location calculator 31*a* of the location of the vehicle 10 at the first information acquisition time and the reference location. Based on the difference between the location of the vehicle 10 at the first information acquisition time and the reference location, the first longitudinal location calculator 32*a* determines the degree of longitudinal shift as the component in the longitudinal direction which is the traveling direction of the vehicle 10. The first longitudinal location calculator 32*a* then notifies the location estimating unit 33 of the degree of longitudinal shift and the first information acquisition time. When the first longitudinal location calculator 32*a* has been notified by the first lateral location calculator 31*a* of information indicating that the location of the vehicle 10 cannot be calculated at the first information acquisition time, it notifies the location estimating unit 33 of the information indicating that the location of the vehicle 10 cannot be calculated.

The second longitudinal location calculator 32*b* determines the degree of longitudinal shift of the vehicle 10 at the second information acquisition time, based on the second image and the map information. The second longitudinal location calculator 32*b* may use the same processing as the first longitudinal location calculator 32*a*, for example, to determine the degree of longitudinal shift of the vehicle 10 at the second information acquisition time, based on the second image and map information. The second longitudinal location calculator 32*b* then notifies the location estimating unit 33 of the degree of longitudinal shift and the second information acquisition time. When the second longitudinal location calculator 32b has been notified by the second lateral location calculator 31b of information indicating that the location of the vehicle 10 cannot be calculated at the second information acquisition time, it notifies the location estimating unit 33 of the information indicating that the location of the vehicle 10 cannot be calculated.

Figure 7:
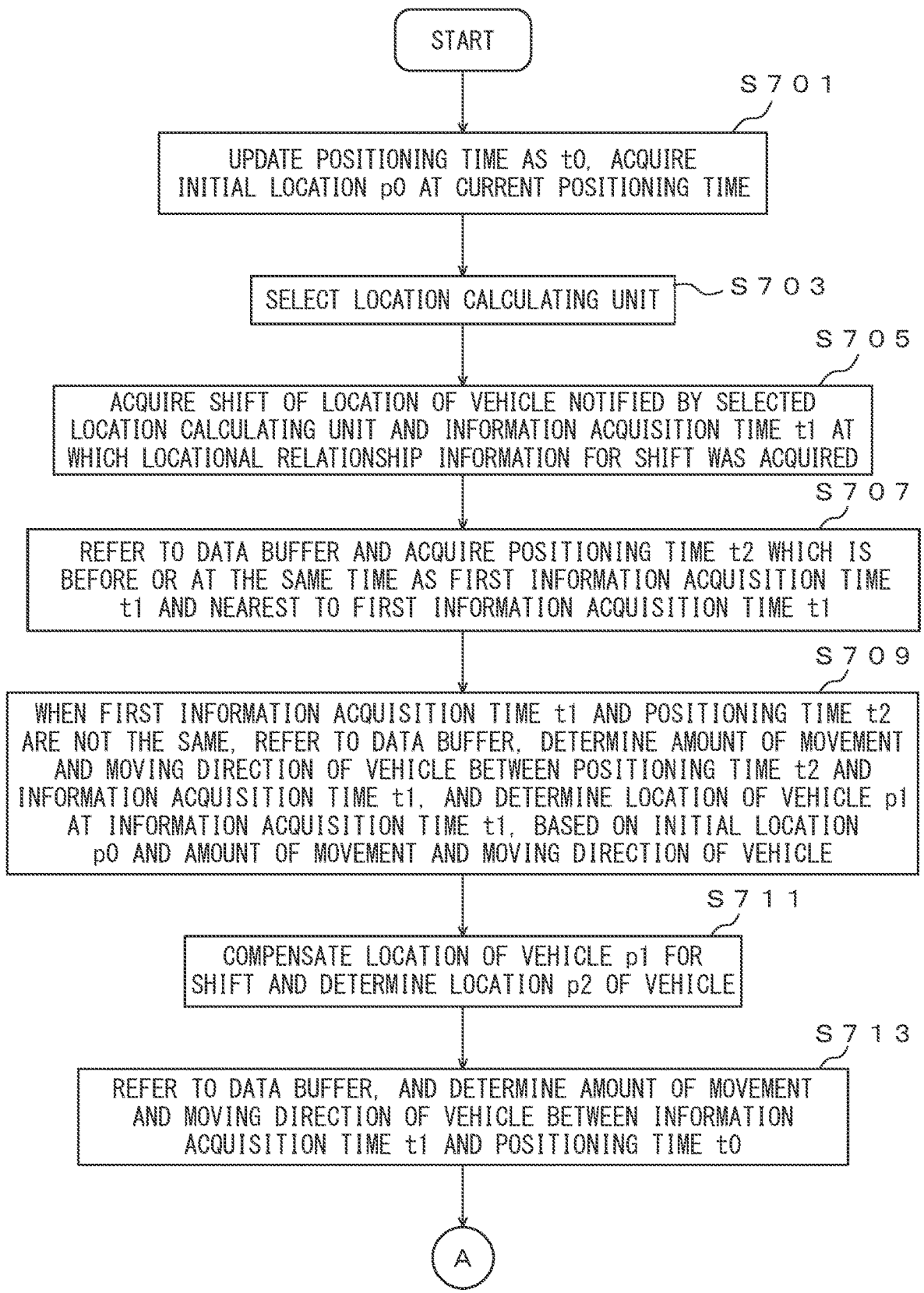
FIG. 7 is a flow chart (1) illustrating the operation of a location estimating unit.
Figure 8:
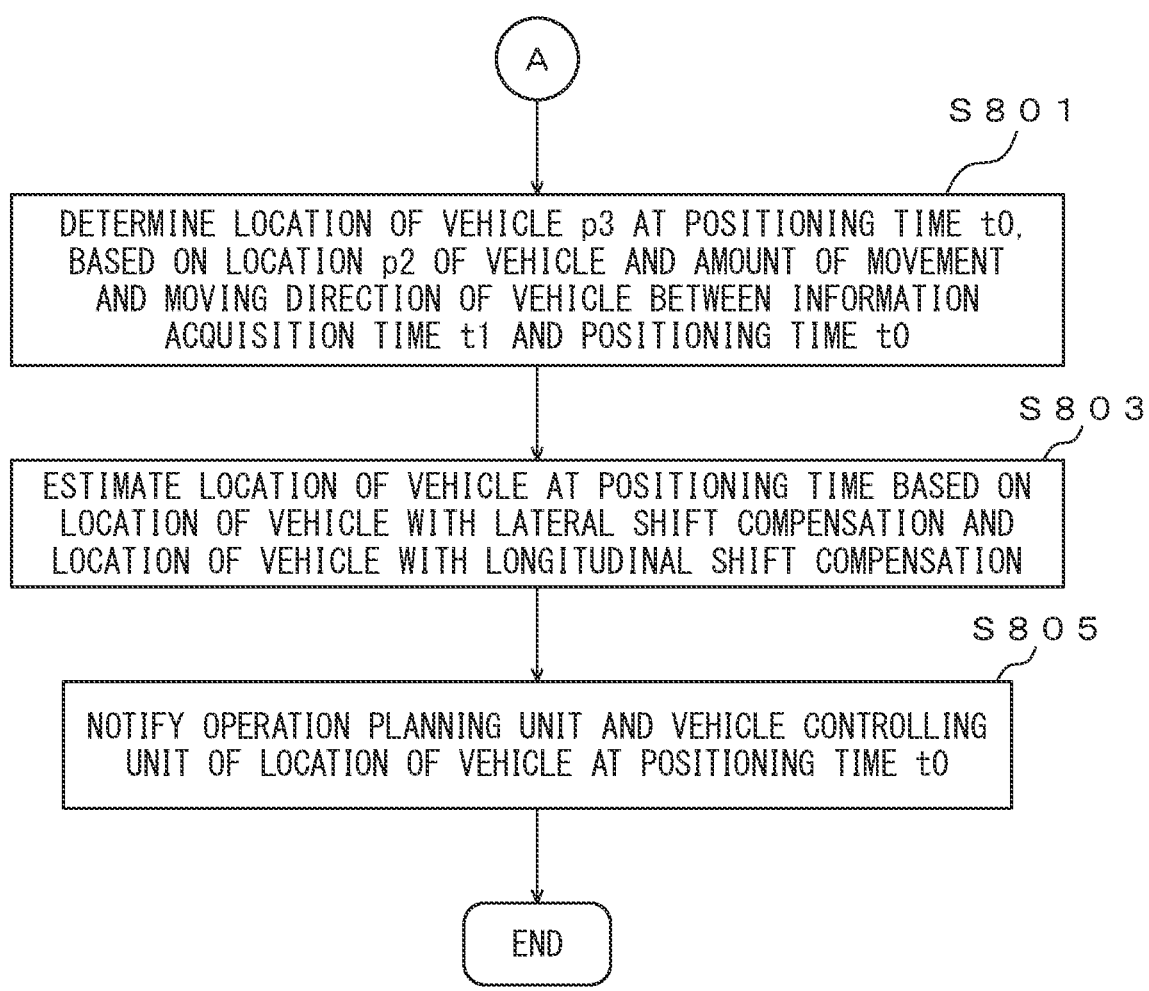
FIG. 8 is a flow chart (2) illustrating the operation of a location estimating unit.

Processing in which the location of the vehicle is estimated by the location estimating unit 33 will now be explained with reference to FIG. 7 to FIG. 9.

First, based on an internal clock, the location estimating unit 33 updates the previous positioning time at a predetermined cycle, to be the current positioning time t0. The location estimating unit 33 also refers to the data buffer in the memory 22 and acquires the initial location p0 at the current positioning time t0, as the location of the vehicle 10 estimated at the previous positioning time (step S701).

The location estimating unit 33 then selects the lateral location calculator to calculate the location in the lateral direction of the vehicle 10 (step S703).

The process by which the location estimating unit 33 selects the lateral location calculator will now be explained with reference to FIG. 9.

The memory 22 stores a priority list (not shown) in which the order of selection of the first and second lateral location calculators is recorded. The location estimating unit 33 refers to the priority list stored in the memory 22, and based on that priority order, selects the lateral location calculator with the highest priority among the selectable lateral location calculators (step S901). The priority order of the lateral location calculators is determined, for example, by the order of highest precision for estimation of the location of the vehicle 10. For this embodiment, the priority order of the lateral location calculators is determined by the order from the first lateral location calculator 31a to the second lateral location calculator 31b.

The location estimating unit 33 then assesses whether or not the location of the vehicle has been determined, based on the locational relationship information acquired by the selected lateral location calculator at the immediately preceding information acquisition time (step S903). When the location estimating unit 33 has not been notified by the selected lateral location calculator of information indicating that the location of the vehicle cannot be calculated, it assesses that the location of the vehicle could be calculated (step S903—Yes), and uses the degree of lateral shift notified by the selected lateral location calculator (step S905). When the location estimating unit 33 has been notified by the selected lateral location calculator of information indicating that the location of the vehicle cannot be calculated, the selected lateral location calculator assesses that the location of the vehicle cannot be calculated (step S903—No), and selects the lateral location calculator with the highest priority among the selectable lateral location calculators, according to the priority in the priority list (step S907). The location estimating unit 33 excludes the lateral location calculator where it has been assessed that the location of the vehicle cannot be calculated, from being selected in subsequent processing.

The location estimating unit 33 also selects a longitudinal location calculator to calculate the location in the longitudinal direction of the vehicle 10, similar to the processing to determine the lateral location calculator as described above (step S703). This completes the explanation of step S703.

The following explanation regards processing of steps S705 to S803, wherein the location estimating unit 33 estimates the location of the vehicle 10 with lateral shift compensation based on the degree of lateral shift notified by the selected lateral location calculator. The processing by which the location estimating unit 33 estimates the location of the vehicle 10 with longitudinal shift compensation based on the degree of longitudinal shift notified by the selected longitudinal location calculator, is similar to the processing for estimation of the location of the vehicle 10 with lateral shift compensation, and therefore the processing for estimation of the location of the vehicle 10 with longitudinal shift compensation will not be explained here.

The location estimating unit 33 acquires the degree of lateral shift of the location of the vehicle 10 and the information acquisition time t1, notified by the selected lateral location calculator (step S705). Regardless of whether or not they are selected by the location estimating unit 33, each of the first and second horizontal location calculators 31a to 31b notifies the location estimating unit 33 of the degree of lateral shift and the information acquisition time for determining the degree of lateral shift, each time the degree of lateral shift of the location of the vehicle 10 is determined.

Next, the location estimating unit 33 refers to a data buffer in the memory 22 (see FIG. 3) and selects the positioning time t2 that is a time before the first information acquisition time t1 and nearest to the first information acquisition time t1 (step S707). Since the cycle of the information acquisition time t1 (for example, 100 msec to 180 msec) is longer than the cycle of the positioning time (for example, 32 msec), the information acquisition time t1 is a time before the most current positioning time stored in the data buffer.

When the first information acquisition time t1 and the positioning time t2 are not the same, the location estimating unit 33 refers to a data buffer in the memory 22 while acquiring the vehicle speed and yaw rate at a time between the positioning time t2 and the information acquisition time t1, to determine the amount of movement and the moving direction of the vehicle between the positioning time t2 and information acquisition time t1. The location estimating unit 33 also calculates the location p1 of the vehicle 10 at the information acquisition time t1, based on the initial location p0 and the amount of movement and moving direction of the vehicle 10 (step S709). When the information acquisition time t1 and positioning time t2 are the same, on the other hand, the location estimating unit 33 obtains the location p1 of the vehicle 10 at the information acquisition time t1, based on the initial location at the next positioning time after the positioning time t2.

The location estimating unit 33 then compensates the location p1 of the vehicle 10 for the degree of lateral shift, and calculates the location p2 of the vehicle at the information acquisition time t1 (step S711). The design may also be such that the location estimating unit 33 is notified by the selected lateral location calculator of the location p2 of the vehicle at the information acquisition time t1, as the location of the vehicle at the information acquisition time t1. The processing from steps S705 to 711 may be omitted in this case.

The location estimating unit 33 then refers to the data buffer of the memory 22 (see FIG. 3), and determines the amount of movement and moving direction of the vehicle 10 between the information acquisition time t1 and the positioning time t0 (step S713). The positioning time t0 is a time after the information acquisition time t1.

The location estimating unit 33 then determines the location of the vehicle p3 at positioning time t0, based on the location p2 of the vehicle 10 and the amount of movement and moving direction of the vehicle 10 between the information acquisition time t1 and the positioning time t0 (step S801). The location estimating unit 33 may also multiply the location of the vehicle p3 by a compensation coefficient to determine the compensated location of the vehicle.

The location estimating unit 33 carries out the same processing as described above to determine the longitudinal location of the vehicle 10 with longitudinal shift compensation at positioning time t0. Because the information acquisition time at which the locational relationship information used to determine the degree of longitudinal shift was acquired may differ from the information acquisition time at which the locational relationship information used to determine the degree of lateral shift was acquired, processing for estimation of the location of the vehicle 10 with longitudinal shift compensation is carried out separately.

The location estimating unit 33 then estimates the location of the vehicle 10 at positioning time t0 based on the location of the vehicle 10 compensated by the lateral shift and the location of the vehicle 10 compensated by the longitudinal shift (step S803). For example, the location estimating unit 33 determines the average value of the location of the vehicle 10 compensated by the lateral shift and the location of the vehicle 10 compensated by the longitudinal shift as the location of the vehicle 10 at positioning time t0. The location estimating unit 33 also records the location of the vehicle 10 at positioning time t0 in the data buffer as the initial location, in relation to the next positioning time updated from positioning time t0 by the predetermined cycle. The location estimating unit 33 also determines the average value for the vehicle speed and yaw rate between the previous positioning time and the current positioning time, based on the input vehicle speed and yaw rate, and it stores the average value in the data buffer of the memory 22 (see FIG. 3) in relation to the current positioning time to.

The location estimating unit 33 then notifies the operation planning unit 35 and the vehicle controlling unit 36 of the location of the vehicle 10 at positioning time t0 (step S805). This completes explanation of processing by the location estimating unit 33.

The detector 34 detects other objects around the vehicle 10 based on the first image, composite image, fourth information and third image. The detector 34 detects objects represented in the first image by inputting the first image into a discriminator, for example. The discriminator may use a deep neural network (DNN) that has been trained to detect objects represented in input images, for example. The detector 34 used may also be a discriminator other than a DNN. For example, the discriminator used by the detector 34 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the detector 34 may detect an object region by template matching between the image and a template in which an object to be detected is represented. Similarly, the detector 34 similarly detects objects represented in images based on the composite image and a third image. The detector 34 also detects objects present in a predetermined direction and distance range based on the fourth information. The detector 34 may also track an object to be detected from an updated image, by matching objects detected in the updated image with objects detected in previous images, according to a tracking process based on optical flow. The detector 34 may also estimate the relative speed of an object with respect to the vehicle 10, based on changes in the size of the object during tracking in images over elapsing time. The detector 34 identifies identical objects among detected objects based on different images, and judges that objects identified as being the same are single objects. The detector 34 notifies the operation planning unit 35 of information indicating the locations of other objects that have been detected.

The operation planning unit 35 acquires information indicating the location of the vehicle 10 at the positioning time and the locations of detected objects, and the map information. Based on this information, the operation planning unit 35 produces one or more scheduled routes for the vehicle 10. The scheduled route is represented as an aggregate of the target locations for the vehicle 10 for different times from the current time up to a predetermined time. The operation planning unit 35 estimates the relative positional relationship between the vehicle 10 and other objects, according to the positional relationship between the location of the vehicle 10, structures on the road represented in the map, and other detected objects. For example, the operation planning unit 35 identifies vehicle lanes in which other objects are moving, according to the positional relationship between lane marking lines represented in the map and other objects, and assesses whether or not the other objects and the vehicle 10 are traveling in the same lane. The operation planning unit 35 also estimates, for example, another object is traveling in a traffic lane defined by two mutually adjacent lane marking lines between which the center location of the other object in the lateral direction is situated. Similarly, the operation planning unit 35 estimates the vehicle 10 is traveling in a traffic lane defined by two mutually adjacent lane marking lines between which the vehicle 10 is situated. The operation planning unit 35 further assesses whether or not the traffic lane in which the vehicle 10 is traveling is the same as the traffic lane in which another object is traveling. Since the space between two adjacent lane marking lines represented in the map is known and the internal parameters of the camera such as the focal length are also known, the distance from the vehicle 10 to the other object can be estimated by the space between the two adjacent lane marking lines on the image. The operation planning unit 35 can therefore estimate the distance from the vehicle 10 to another object based on the space between two adjacent lane marking lines represented in the map at the location of the other object on the image. The operation planning unit 35 thus estimates the relative positional relationship between the other object and the vehicle 10, by the positional relationship with structures on the road represented in the map. The operation planning unit 35 can therefore accurately estimate the relative positional relationship between other objects and the vehicle 10 even when structures on the roads such as lane marking lines are not clearly visible in the image.

The operation planning unit 35 estimates the future trajectory of another detected object based on its current and past trajectories, and based on the traffic lane in which the other detected object is traveling and its relative distance, produces a scheduled route for the vehicle 10, so that either the other object and the vehicle 10 travel in different traffic lanes, or so that at least a prescribed distance is maintained for the relative distance from the vehicle 10 to the other object. The operation planning unit 35 may also produce multiple scheduled routes. In this case, the operation planning unit 35 may select the route among the multiple scheduled routes that minimizes the sum of absolute accelerations for the vehicle 10. The operation planning unit 35 notifies the vehicle controlling unit 36 of the produced scheduled routes.

The vehicle controlling unit 36 controls each unit of the vehicle 10 based on the location of the vehicle 10 at the positioning time and the vehicle speed and yaw rate, as well as on the notified scheduled route, so that the vehicle 10 travels along the notified scheduled route. For example, the vehicle controlling unit 36 determines the steering angle, acceleration and angular acceleration of the vehicle 10 according to the notified scheduled route and the current vehicle speed and yaw rate of the vehicle 10, and sets the amount of steering, and the accelerator or brake level so as to match that steering angle, acceleration and angular acceleration. The vehicle controlling unit 36 also outputs a control signal corresponding to a set steering amount, to an actuator (not shown) that controls the steering wheel for the vehicle 10. The vehicle controlling unit 36 also determines the amount of fuel injection according to a set accelerator level, and outputs a control signal corresponding to the amount of fuel injection to the engine fuel injector (not shown) of the vehicle 10. Alternatively, the vehicle controlling unit 36 may output a control signal corresponding to a set brake level to the brake (not shown) of the vehicle 10.

As explained above, based on first locational relationship information representing the location of a moving object acquired using a first locational information acquiring unit such as a camera mounted on the moving object, the location-estimating device calculates a first estimated location for the moving object at a first information acquisition time at which first locational relationship information was acquired. Moreover, based on second locational relationship information representing the location of the moving object acquired using a second locational information acquiring unit, the location-estimating device calculates a second estimated location for the moving object at a second information acquisition time at which second locational relationship information was acquired. When the first estimated location has been determined based on the first locational relationship information acquired at the preceding first information acquisition time, the location-estimating device estimates the location of the moving object at the current time, based on the first estimated location and the first movement amount and first moving direction of the moving object between the first information acquisition time and the current time. When the first estimated location cannot be determined based on the first locational relationship information acquired at the preceding first information acquisition time, the location-estimating device estimates the location of the moving object at the current time based on the second estimated location and the second movement amount and second moving direction of the moving object between the preceding second information acquisition time and the current time. Thus, the location-estimating device can determine the location of the moving object at high precision even when it has changed the positional information-acquiring device that acquires the information for calculation of the location of the moving object.

For the purpose of the invention, the location-estimating device and computer program for location estimation of the embodiment described above may incorporate appropriate modifications that are still within the gist of the invention.

For example, the first and second lateral location calculators that determine the location of the vehicle in the lateral direction and the first and second vertical location calculators that determine the location of the vehicle in the longitudinal direction are merely examples, and there are no particular restrictions on the method by which the location-estimating device calculates the lateral location and the longitudinal location of the vehicle. It is sufficient if the location-estimating device has at least two means for calculating the lateral location and longitudinal location of the vehicle. For example, the location-estimating device may determine the degree of lateral shift or degree of longitudinal shift of the vehicle based on the image produced by the third camera, the fourth information produced by the LiDAR sensor, or the third image produced by the fourth camera 6.

The location-estimating device may also have multiple location calculating units that calculate the degree of lateral shift or degree of longitudinal shift of the vehicle using different algorithms, but based on locational relationship information acquired by the same locational relationship information-acquiring device. For example, the second lateral location calculator in the embodiment described above calculated the degree of lateral shift of the vehicle using the same algorithm as the first lateral location calculator, but instead, the second lateral location calculator may calculate the degree of lateral shift of the vehicle using a different algorithm from the first lateral location calculator. Similarly, the second longitudinal location calculator in the embodiment described above calculated the degree of longitudinal shift of the vehicle using the same algorithm as the first longitudinal location calculator, but instead, the second longitudinal location calculator may calculate the degree of longitudinal shift of the vehicle using a different algorithm from the first longitudinal location calculator.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions and alterations could be made hereto without departing from the spirit and scope of the invention.

The invention claimed is:

1. A location-estimating device comprising:
a first input device,
a second input device, and
a processor configured to
acquire first locational relationship information as a location of a moving object at a first information acquisition time, the first information acquisition time relating to a first cycle duration of the first input device,
calculate a first estimated current location for the moving object at the first information acquisition time based on the first locational relationship information,
acquire second locational relationship information as the location of the moving object at a second information acquisition time, the second information acquisition time relating to a second cycle duration of the second input device,
calculate a second estimated current location for the moving object at the second information acquisition time based on the second locational relationship information, and
when the first estimated location is able to be determined based on the first locational relationship information acquired at a preceding first information acquisition time, calculate a first movement amount and first moving direction of the moving object between the first information acquisition time and a current time, based on information representing a behavior of the moving object, and estimate the location of the moving object at the current time based on the first estimated location and the first movement amount and first moving direction of the moving object, and when the first estimated location is not able to be determined based on the first locational relationship information acquired at the preceding first information acquisition time, select the second estimated location and calculate a second movement amount and second moving direction of the moving object between a preceding one information acquisition time of the second information acquisition time corresponding to the selected second estimated location and the current time based on information representing the behavior of the moving object, and estimate the location of the moving object at the current time based on the second estimated location and the second movement amount and second moving direction of the moving object.

2. The location-estimating device according to claim 1, wherein an interval for estimation of the location of the moving object by the processor is shorter than the first cycle duration and second cycle duration.

3. The location-estimating device according to claim 1, wherein a precision of the first estimated current location is higher than a precision of the second estimated current location.

4. A computer readable non-transitory storage medium which stores a computer program for location estimation that causes a processor to acquire first locational relationship information from a first input device as a location of a moving object at a first information acquisition time the first information acquisition time relating to a first cycle duration of the first input device, calculate a first estimated current location for the moving object at the first information acquisition time based on the first locational relationship information, acquire second locational relationship information from a second input device as a location of the moving object at a second information acquisition time, the second information acquisition time relating to a second cycle duration of the second input device, calculate a second estimated current location for the moving object at the second information acquisition time based on the second locational relationship information, and when the first estimated location is able to be determined based on the first locational relationship information acquired at a preceding first information acquisition time, calculate a first movement amount and first moving direction of the moving object between the first information acquisition time and a current time, based on information representing a behavior of the moving object, and estimate the location of the moving object at the current time based on the first estimated location and the first movement amount and first moving direction of the moving object, and when the first estimated location is not able to be determined based on the first locational relationship information acquired at the preceding first information acquisition time, select the second estimated location and calculate a second movement amount and second moving direction of the moving object between a preceding one information acquisition time of the second information acquisition time corresponding to the selected second estimated location and the current time based on information representing the behavior of the moving object, and estimate the location of the moving object at the current time based on the second estimated location and the second movement amount and second moving direction of the moving object.

* * * * *